United States Patent [19]

Nilsson et al.

[11] Patent Number: 4,922,271

[45] Date of Patent: May 1, 1990

[54] MATRIX PRINTER MEANS

[75] Inventors: Kenth Nilsson, Akersberga; Bengt Jofs, Spanga; Goeran Skog, Stockholm, all of Sweden

[73] Assignee: Siemens Aktiengesellschaft, Berlin and Munich, Fed. Rep. of Germany.

[21] Appl. No.: 244,508

[22] Filed: Sep. 14, 1988

[30] Foreign Application Priority Data

Sep. 14, 1987 [DE] Fed. Rep. of Germany ....... 3730844

[51] Int. Cl.[5] .................... G01D 15/00; G01D 15/16; B41J 3/04

[52] U.S. Cl. ............................ 346/140 R; 101/93.04; 400/121; 346/76 PH

[58] Field of Search .................... 346/140, 75, 76 PH, 346/155, 160, 165; 400/82, 120, 124, 126, 121; 101/93.04

[56] References Cited

U.S. PATENT DOCUMENTS

| | | | |
|---|---|---|---|
| 3,560,641 | 2/1971 | Taylor | 346/75 X |
| 4,063,254 | 12/1977 | Fox | 346/75 X |
| 4,072,959 | 2/1978 | Elmqvist | 346/140 |
| 4,232,324 | 7/1980 | Tsao | 346/75 |
| 4,536,097 | 8/1985 | Nilsson | 346/140 |
| 4,593,295 | 6/1986 | Matsufuji et al. | 346/140 |
| 4,622,560 | 11/1986 | Withoos | 346/140 X |
| 4,660,052 | 4/1987 | Kaiya | 346/76 PH |
| 4,680,596 | 7/1987 | Logan | 346/140 |

FOREIGN PATENT DOCUMENTS

| | | |
|---|---|---|
| 0082336 | 11/1982 | European Pat. Off. . |
| 2527647C3 | 6/1975 | Fed. Rep. of Germany . |
| 3306098A1 | 2/1983 | Fed. Rep. of Germany . |
| 3208104 | 9/1983 | Fed. Rep. of Germany . |
| 59-95159 | 1/1984 | Japan . |

OTHER PUBLICATIONS

"Wire Matrix Printer" by D. K. Rex, IBM Technical Disclosure Bulletin, vol. 21, No. 1, Jun., 1978.

*Primary Examiner*—Joseph W. Hartary
*Attorney, Agent, or Firm*—Hill, Van Santen, Steadman & Simpson

[57] ABSTRACT

Matrix printer means having plurality of write heads. In order to be able to achieve a print width in matrix printer means that is greater than that of an individual write head and in order to simultaneously enhance the resolution beyond the basic resolution of the write head or in order to enable multi-color printing, a plurality of rows of write heads are provided. The neighboring write heads in one row and the rows themselves are arranged phase-shifted relative to one another or the colors of the write heads in every row and between the rows are cyclically interchanged. The plurality of required rows of write heads is thus reduced to a minimum.

11 Claims, 7 Drawing Sheets

MATRIX PRINTER MEANS

BACKGROUND OF THE INVENTION

The present invention is directed to a matrix printer means. The matrix printer means has a plurality of write heads arranged side-by-side in a row. Each of the write heads has a limited plurality of printer elements per unit length of the write head with an edge region that is greater than half the spacing between neighboring printer elements. The matrix printer means also has at least two such rows arranged parallel to one another. The term "matrix printer means" refers to all printer means that apply punctiform courses, alphanumerical characters or images on a recording medium. Examples of such printers are wire matrix printers or ink jet printers. The width of the write heads is limited by manufacturing restrictions. Also, the distance between neighboring printer elements can not be arbitrarily reduced for the same reasons. For example, German reference No. DE 25 27 647 Cl discloses an ink mosaic printer means of this type. The maximum resolution that is possible is approximately 4 printer elements, i.e. ink jets, per mm.

German reference No. DE 33 06 098 Al discloses a different matrix printer means having what is referred to as a channel matrix, whereby resolution is increased by arranging two or more rows of ink channels offset relative to one another. This arrangement can be used not only for enhanced resolution but also for multi-colored recording.

When a print width that is greater than that of the individual head is desired for stationary write heads, a plurality of these write heads must be arranged in a row. The problem that has occurred is that the edge regions of the individual write heads that do not have any printer elements are larger than half the distance between two printer elements, again for manufacturing reasons. Even for write heads abutting one another, a gap arises between the last printer element of the one write head and the first printer element of the other write head, this gap usually being significantly larger than the distance between two printer elements of a head. This means that constant high resolution over the entire writing width cannot be achieved with a simple joining of a plurality of write heads. If one wishes to retain the resolution of a write head for the entire print width, then in the prior art the individual write heads were not arranged in one row, but in two rows with offset gaps.

SUMMARY OF THE INVENTION

An object of the present invention is to provide a matrix printer means for the type initially cited such that a print width is achieved that is greater than that of a single write head, and whereby the resolution is better than that of the individual write head. Further, the number of needed rows of write heads should be kept as small as possible.

This object is inventively achieved by a matrix printer means in which two rows of write heads are provided wherein neighboring write heads in a row and the rows are arranged phase-shifted relative to one another. The phase is to be understood as the distance of the individual printer elements from one another. The distance between two printer elements in a write head thereby corresponds to a phase shift of 360°. The inventive arrangement of the write heads makes it possible to obtain an enhanced resolution and, at the same time, a great print width with a minimum plurality of rows of write heads. If an attempt were made to achieve this goal with prior art write heads, then two rows of these write heads would already have to be provided with offset gaps for covering the entire, desired print width even to achieve the basic resolution, that is the resolution of the individual write heads. If one wished to merely double the resolution, then two further rows would have to be provided, again with offset gaps, this time having a phase shift of 180° relative to those of the first two rows. Four rows of write heads would thus already be needed overall. Correspondingly, six rows would be necessary for three times the resolution.

In contrast thereto, only one more row that corresponds to enhancement of the resolution is required in accordance with the present invention, i.e. three rows are required for a resolution that is twice as great and four rows are required for a resolution that is three times as great.

Instead of serving the purpose of enhanced resolution the matrix printer means of the present invention can also be used for achieving a multi-color printing. When the normal grid principle is used wherein a shift is present between the individual color dots, the factor by which the resolution would otherwise be increased can merely be replaced by the plurality of desired colors. Four rows are thus required for three-color printing, whereby every row has one color assigned to it and the first and fourth rows use the same color.

When, by contrast, a multi-color printing "in phase" is desired, i.e. a printing wherein different colors are allocated to the same recording location, then a zero phase shift is selected in accordance with the present invention and the color of the write heads in every row and between the rows is cyclically interchanged.

It is advantageously possible within the framework of the present invention to combine enhanced resolution and colored printing. When multi-color printing in phase and enhanced resolution are to be combined, then additionally defined provisions must be undertaken. Either one must use write heads having different lengths or every printer element in every write head cannot be utilized.

What must be considered in every case is that all printer elements of the outermost write heads cannot be utilized without special measures, such as shortened write heads.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several figures of which like reference numerals identify like elements, and in which:

FIGS. 6 and 7 are schematic representations of embodiments of the present invention for three-color and four-color printing, respectively, with color points chromatically shifted grid-like;

DESCRIPTION OF THE PREFERRED EMBODIMENT

Figure 1:
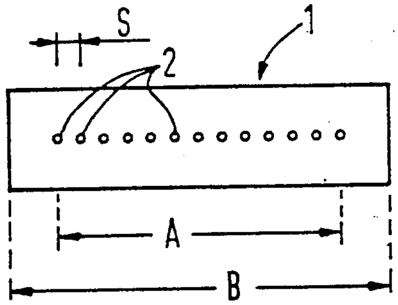
FIG. 1 is a schematic view of an individual write head.

FIG. 1 schematically shows a write head (1) that, for example, can represent the plan view of the nozzle exit openings of a piezoelectric ink jet printer. The printer elements (2) are formed by the nozzle exit openings.

As already initially mentioned, a wire printer or thermoprinter can be used instead of an ink jet printer. The only thing that is critical is that, for example, the alphanumerical characters or images that are to be portrayed on a recording medium are composed of the dots of a matrix.

A few quantities that are of significance for an understanding of the following figures shall be defined with reference to FIG. 1. The print width of the write head (1) is referenced A, i.e. the distance from the center of the printer element at the outermost left to the center of the printer element at the outermost right. The width of the overall write head is referenced B and the distance between two printer elements (calculated from center to center) is referenced s.

Figure 2:
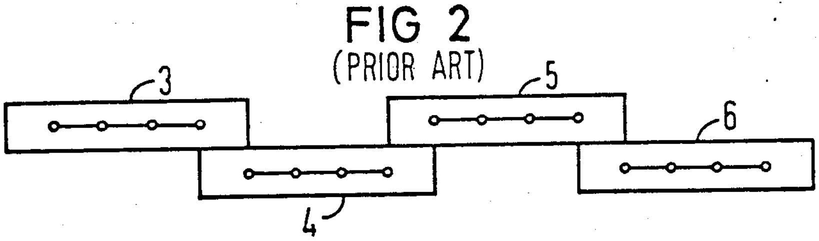
FIG 2 (PRIOR ART)
FIGS. 2 and 3 are schematic views of arrangements known in the prior art for broadening the print width or for enhancing the resolution.

FIG. 2 schematically shows a prior art printer means wherein the sole concern is to increase the print width for stationary write heads with unmodified resolution. The resolution of the individual write head is referred to below as a basic resolution G. Four write heads (3 through 6) are arranged zig-zag-like in two rows in FIG. 2 with offset gaps. As can be derived both from FIG. 1 as well as from FIG. 2, the write heads (1, 3 through 6) exhibit edge regions that are larger than half the distance between two printer elements 2. It is therefore not possible to arrange the write heads in one row without accepting losses in resolution in the transition region from one write head to the other. For the extremely small dimensions—roughly four printer elements per mm are currently achievable in practice—, it is hardly possible in terms of manufacturing technology to achieve narrower edge regions.

Figure 3:
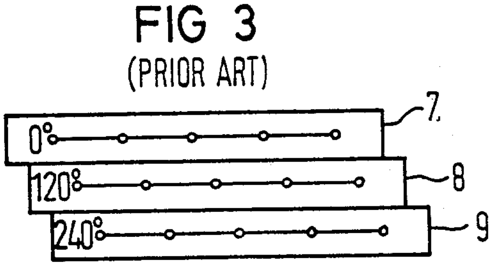
FIG 3 (PRIOR ART)

FIG. 3 shows a prior art arrangement disclosed, for example, by German reference No. DE 33 06 098 Al for enhancing the resolution for a print width that approximately corresponds to the print width A. Three write heads (7 through 9) that are each phase-shifted by 120° relative to one another are shown for this purpose. A resolution that is three times higher than the basic resolution G can thereby be achieved. The factor by which the basic resolution must be multiplied in order to arrive at the achieved resolution is referenced n. The distances between the matrix points producible with the printer elements in comparison to the distance between the printer elements themselves are reduced by this factor.

Figure 4:
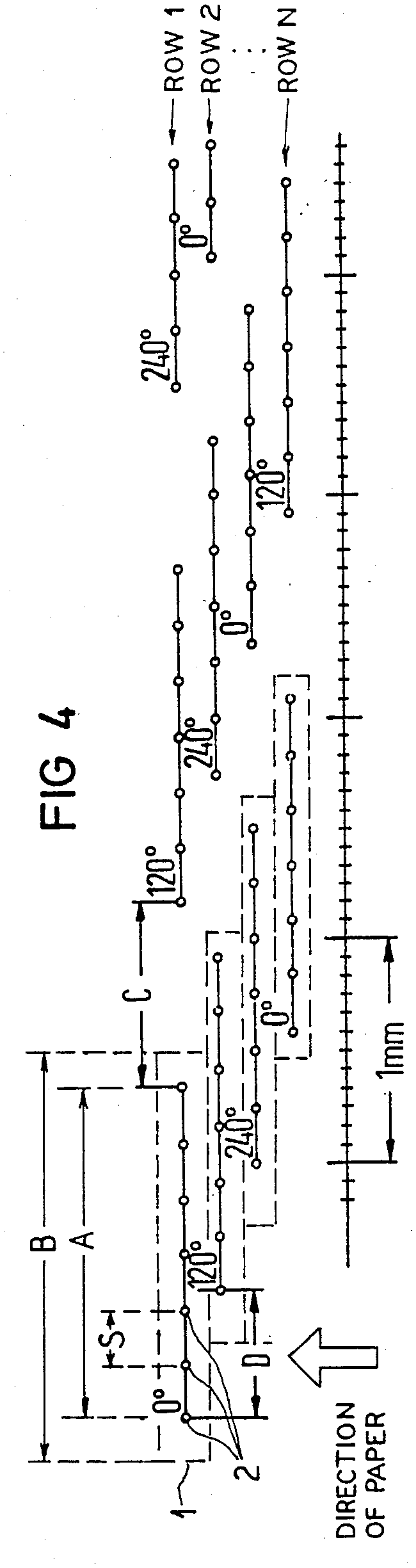
FIGS. 4 and 5 are schematic representations of embodiments of the present invention having resolution enhanced by a factor of 3 and 4, respectively.

FIG. 4 shows a first exemplary embodiment of the present invention having a basic resolution G of four printer elements per mm and having a factor n=3 for the enhancement of the resolution. In order for all printer elements of a write head to be utilized, $$M=m\times n+1$$

should be valid for the plurality M of printer elements for each write head, whereby m is an arbitrary, natural number not equal to zero. Let it be noted at this point that not all printer elements of the write head seated farthest toward the outside can be used for the enhanced resolution when this outer write head is not formed shorter than the others. In the example of FIG. 4, m=2 is selected. As a result M=7, i.e. seven printer elements per write head. For simplification of the illustration, only the printer elements along a line represented as circles are shown for the write heads.

In general, a number of formulas can be derived from which the arrangement of the present invention can be calculated. Thus, the print length is $A=(M-1)\times s$. The shift D between the write heads of two neighboring rows is $D=(m+1/n)\times s=A/n+1/n\times s$. The distance C between the last printer element of the one write head and the first printer element of the next, following write head is $C=(m+1+1/n)\times s=D+s$. Also added thereto is a condition for the width B of the write head. The following must be valid for B:

$$B\leqq(m\times n+m+1+1/n)\times s=M\times s+D=A+D+s=A+C$$

The possible recording points are illustrated in the lower portion of FIG. 4. As may be seen therefrom, the resolution has been enhanced to 12 recording points per mm over a total print width that proceeds far beyond that of a single write head. The only thing required is n+1 rows of write heads that are skillfully arranged phase-shifted.

Figure 5:
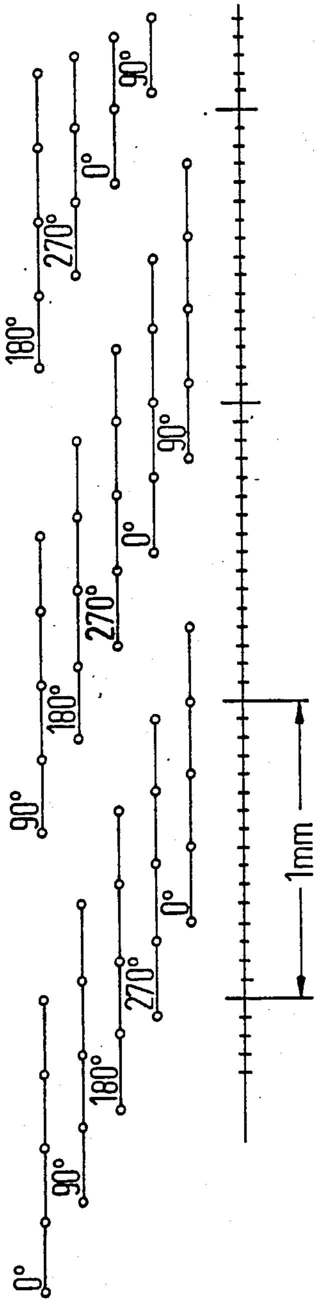

FIG. 5 shows a similar illustration for n=4, m =1 and M=5. The necessary phase shift in this example is 90°. In this case, the resolution is 16 recording points per mm.

Figure 6:
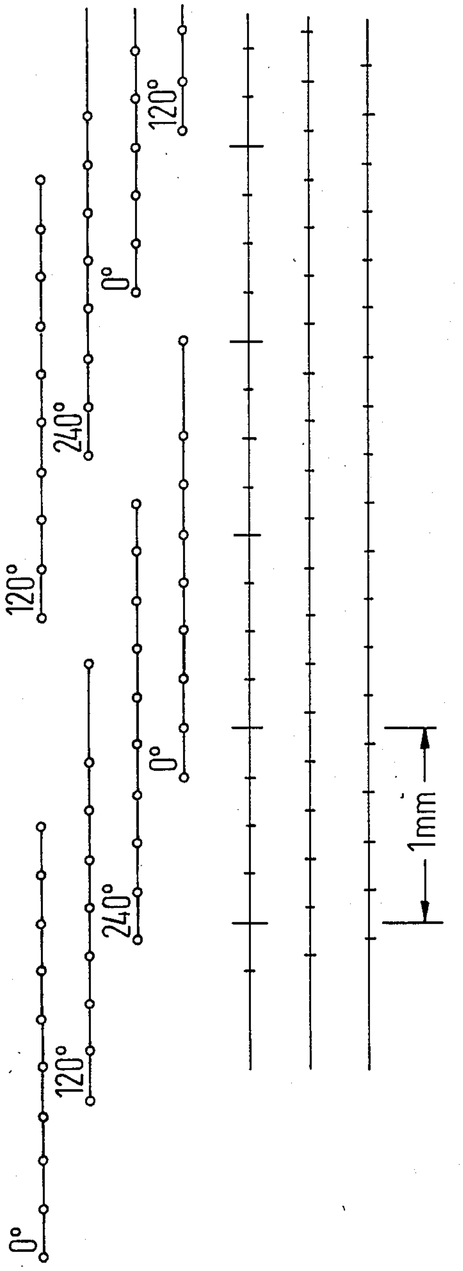

As already mentioned, the matrix printer means of the present invention can also be used for multi-color representation. FIG. 6 shows an exemplary embodiment of a three-color representation having a resolution that corresponds to the basic resolution G. In this case, for example, let it again be assumed that the basic resolution amounts to four print elements per mm. It is also assumed that the three colors are to be represented offset relative to one another based on the grid principle. The same principle as for the enhanced resolution according to FIG. 4 is valid for this case. The factor 3 is selected for n, wherein the number of colors to be portrayed and not the enhanced resolution is indicated in this case. Three is likewise selected for m and as a result M=10. For example, yellow, cyan blue and magenta red are selected as colors. The phase shift again is 120°. The recording points of the three colors with the corresponding phase shift are shown in the lower portion of FIG. 6.

Figure 7:
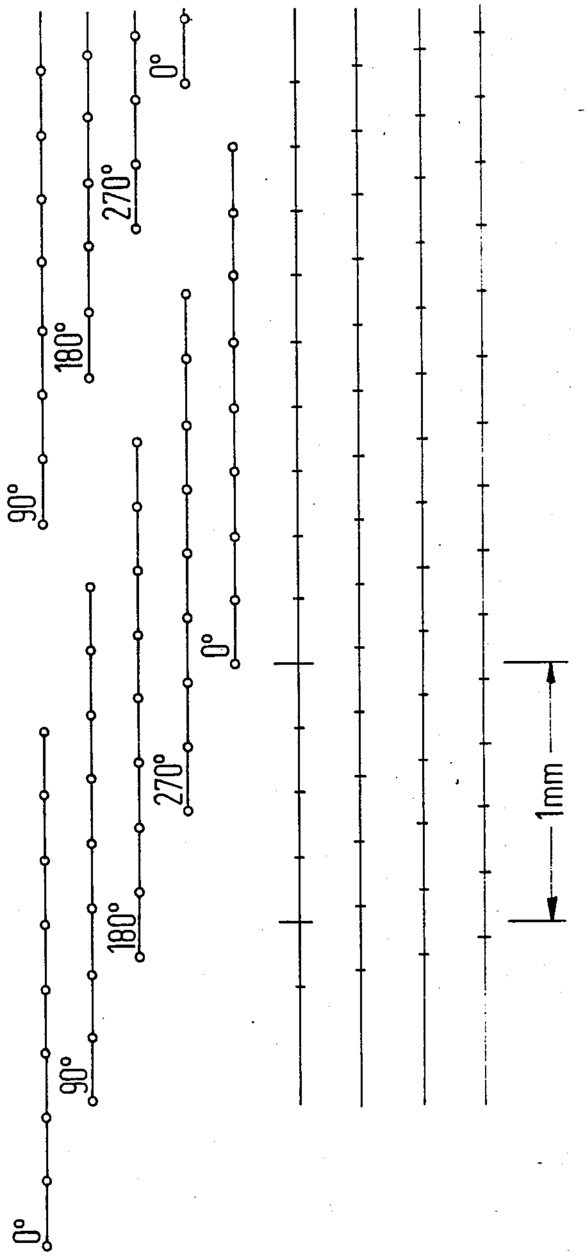

FIG. 7 shows a further example for four colors, wherein black has been added as fourth color.

Figure 8:
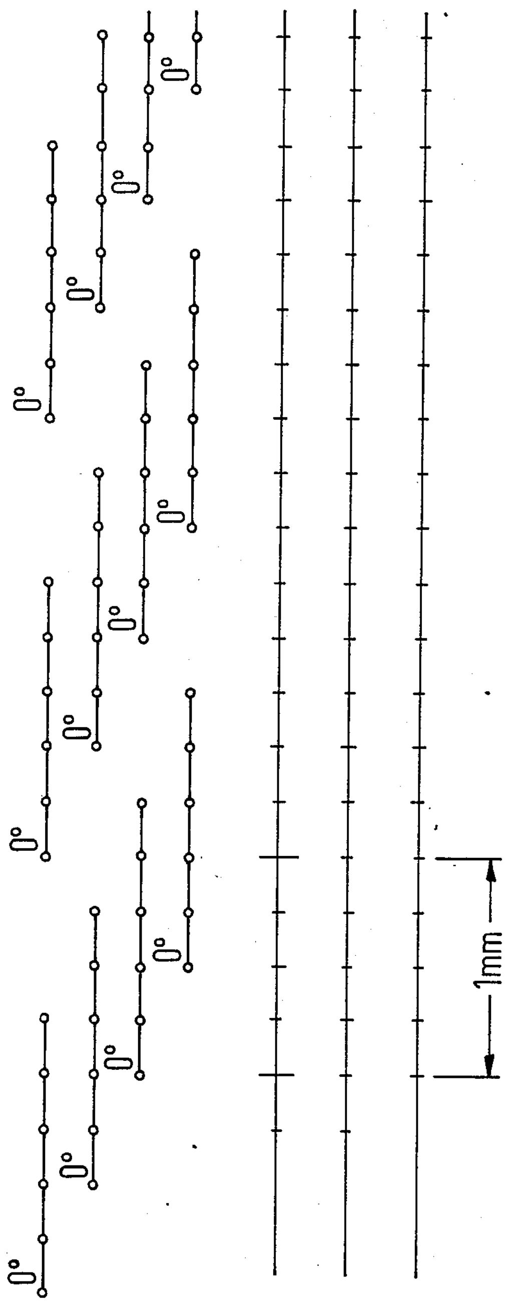
FIGS. 8 and 9 are schematic representations of embodiments of the present invention for three-color and four-color printing, respectively, whereby all colors are allocated to one and the same recording location.
Figure 9:
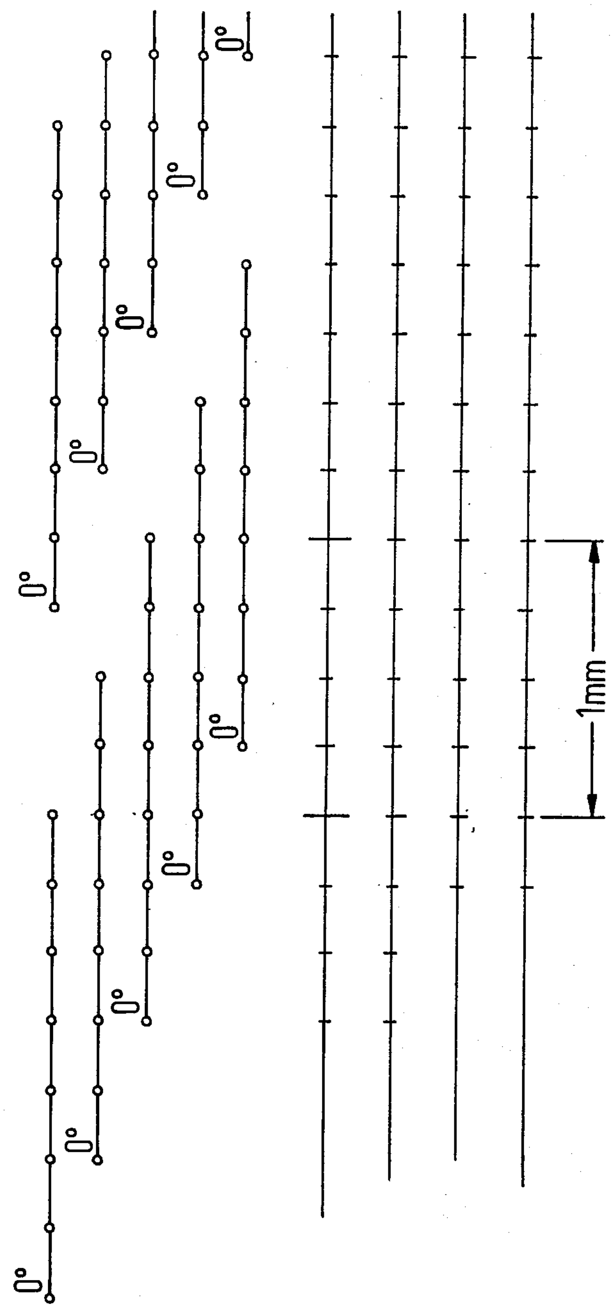

When, in contrast to the last two exemplary embodiments, multi-color representations are intended wherein all colors lie, so to speak, "in phase", i.e. that they are placed on top of one another at the same recording location, then the equations must be slightly varied. In order to again be able to use all printer elements of a write head, the number of printer elements per write head M must be selected as $M=m\times n$. The print width is $A=(M-1)\times s$. The shift is $D=m\times s$. The distance of the printer elements between two neighboring write heads thus becomes $C=(m+1)\times s=D+s$. Valid here for the width of the write head is $B\leqq(n+1)\times m+s$. As before, the plurality of required rows of write heads is $n+1$. FIGS. 8 and 9 show two examples of three-color and four-color representations, respectively.

Figure 10:
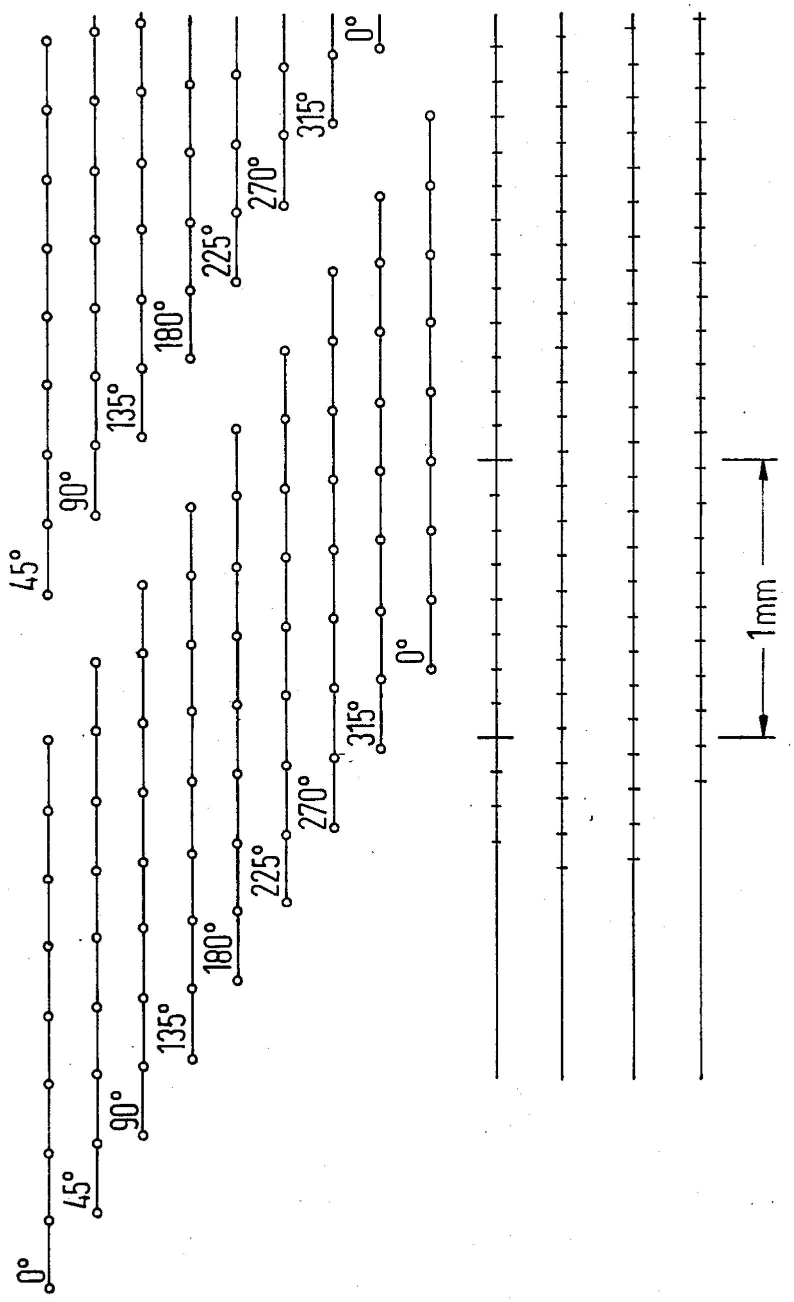
FIG. 10 is a schematic representation of an embodiment of four-color printing with double the resolution.

As already mentioned, it is also advantageously possible with the matrix printer means of the present invention to combine multi-color representations with enhanced resolution. With $n=8$, for example, a four-color representation with twice the basic resolution for each color can be obtained. Only nine rows of write heads are required in comparison to 16 rows for a conventional arrangement. This case shown in FIG. 10.

Figure 11:
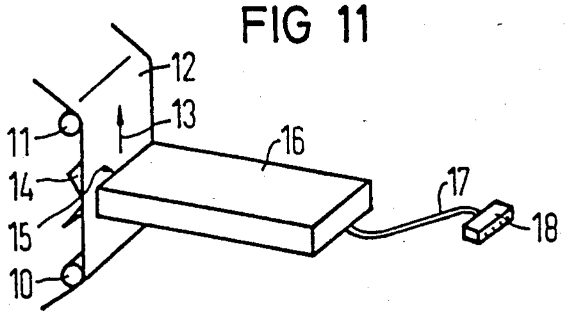
FIG. 11 is a perspective view of a complete printer means having a recording medium.

Finally, the last FIG. 11, schematically shows the outer fundamentally structure of a complete matrix printer means. A recording medium (12), for example normal scaled paper, is drawn over a spacer (14) pas the end face (15) of a housing (16) via conveyor rollers (10, 11). The connecting line (17) that has its free end equipped with a plug (18) for connection to a corresponding control means is conducted into the housing (16), this control means supplying the control signals for recording the desired courses, characters or images. The housing (16) contains the inventively arranged rows of write heads.

The invention is not limited to the particular details of the apparatus depicted and other modifications and applications are contemplated. Certain other changes may be made in the above-described apparatus without departing from the true spirit and scope of the invention herein involved. It is intended, therefore, that the subject matter in the above-depiction shall be interpreted as illustrative and not in a limiting sense.

What is claimed is:

1. A matrix printer means comprising a plurality of stationary write heads, each of said write heads having a limited number of printer elements per unit of length and having an edge region that is greater than half the spacing between neighboring printer elements, said write heads being arranged phase-shifted side-by-side in at least three rows and at least in three of said rows the write heads being parallel and arranged phase-shifted relative to one another.

2. The matrix printer means according to claim 1, wherein the phase shift is inversely proportional to a whole-numbered factor $n>1$ by which the resolution of the matrix printer is enhanced relative to the resolution of a single write head of said plurality of stationary write heads.

3. The matrix printer means according to claim 2, whereby M is the number of printer elements per write head, A is the distance between the centers of the two outermost printer elements of the write head and s is the distance between two adjacent printer elements, wherein the write heads in neighboring rows are offset by the distance $D=A/n+1/n\times s$ and, within the same row, the distance C between the last printer element of one write head and the first printer element of the neighboring write head is $C=D+s$.

4. The matrix printer means according to claim 1, wherein a plurality of colors is used for printing such that every write head has only one predetermined color of the plurality of colors and the colors of the write heads in every row and between the rows are cyclically interchanged.

5. Matrix printer means according to claim 4, wherein said phase shift is inversely proportional to the number of colors.

6. The matrix printer means according to claim 5, wherein said phase shift is inversely proportional to a whole-numbered factor n, which is a sum of said number of colors used and the factor by which the resolution of the matrix printer means is enhanced over the resolution of a single write head.

7. The matrix printer means according to claim 6, wherein M is a number of printer elements per write head, A is a distance between the center of the two outmost printer elements of a write head and s is a distance between two adjacent printer elements, wherein the write heads in neighboring rows are off-set by a distance $D=A/n+1/n\times s$, and, within the same row, a distance C between a last printer element of one write head and a first printer element of a neighboring write head is $C=D+s$.

8. A matrix printer means comprising a plurality of write heads arranged side-by-side in a row, each of said write heads having a limited number of printer elements per unit of length and having an edge region that is greater than half the spacing between neighboring printer elements, and having at least three such rows arranged parallel to one another and arranged phase-shifted relative to one another, the phase shift being inversely proportional to a whole-numbered factor $n>1$ by which the distance between matrix points producible by the printer elements is reduced in comparison to the distance between the printer elements.

9. The matrix printer means according to claim 8, whereby M is the number of printer elements per write head, A is the distance between the centers of the two outermost printer elements of a write head and s is the distance between two adjacent printer elements, wherein the write heads in neighboring rows are offset by the distance $D=A/n+1/n\times s$ and, within the same row, the distance C between the last printer element of one write head and the first printer element of the neighboring write head is $C=D+s$.

10. A matrix printer means for producing a plurality of colors that are all allocatable to one matrix point, respectively, comprising a plurality of write heads, each of said write heads having a limited number of printer elements per unit of length and having an edge region that is greater than half the spacing between neighboring printer elements, the write heads being arranged in rows and within a row being arranged side-by-side with zero phase shift relative to one another, the number of rows being one greater than the number of colors in the plurality of colors, the colors of the write heads in every row and between the rows being cyclically interchanged.

11. The matrix printer means according to claim 10, wherein the write heads in neighboring rows are off-set by a distance $D=M/n\times s$, where n is the number of colors to be used, M is the plurality of printer elements per write head, and s is the distance between two adjacent printer elements.

* * * * *